No. 656,742. Patented Aug. 28, 1900.
J. M. LEAVER.
APPARATUS FOR MANUFACTURING ARTICLES FROM PULP MATERIALS.
(Application filed Nov. 8, 1899.)
(No Model.) 3 Sheets—Sheet 1.
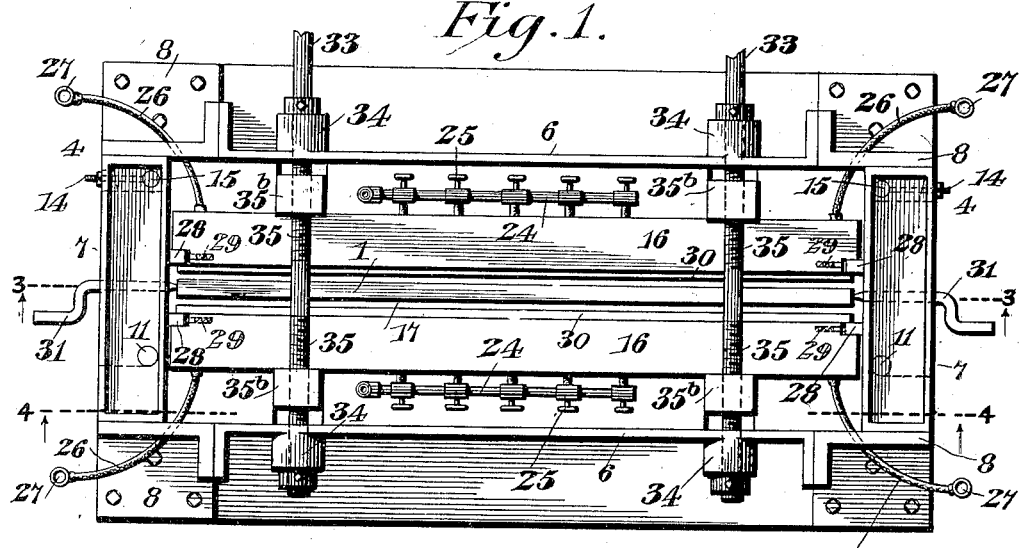
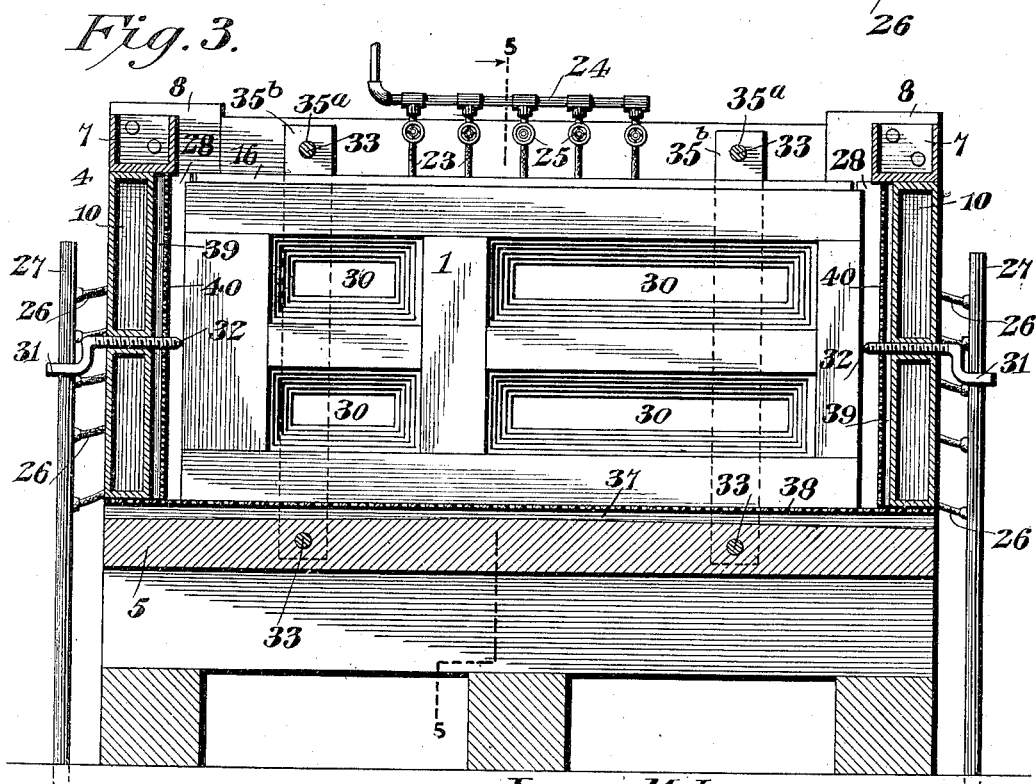
James M. Leaver, Inventor No. 656,742. Patented Aug. 28, 1900.
J. M. LEAVER.
APPARATUS FOR MANUFACTURING ARTICLES FROM PULP MATERIALS.
(Application filed Nov. 8, 1899.)
(No Model.) 3 Sheets—Sheet 2.
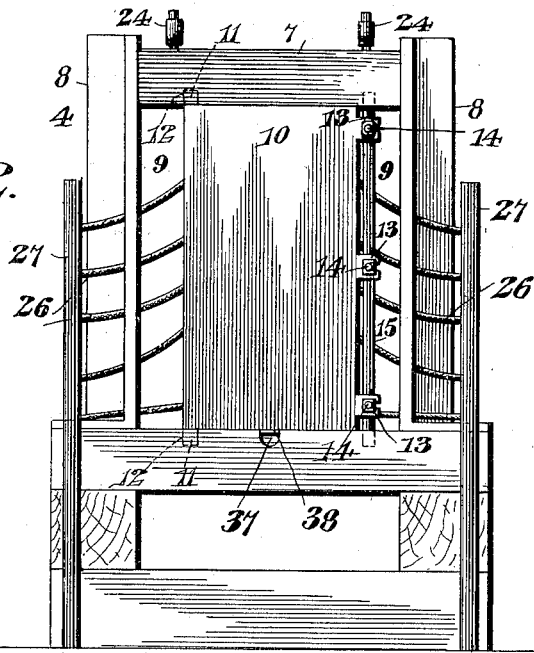
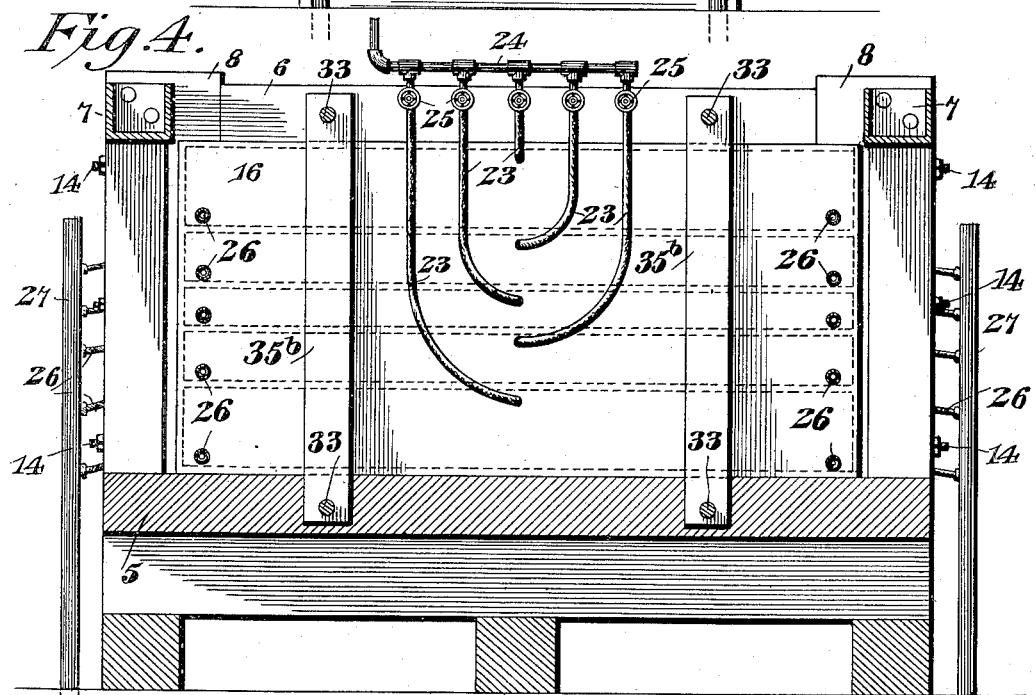

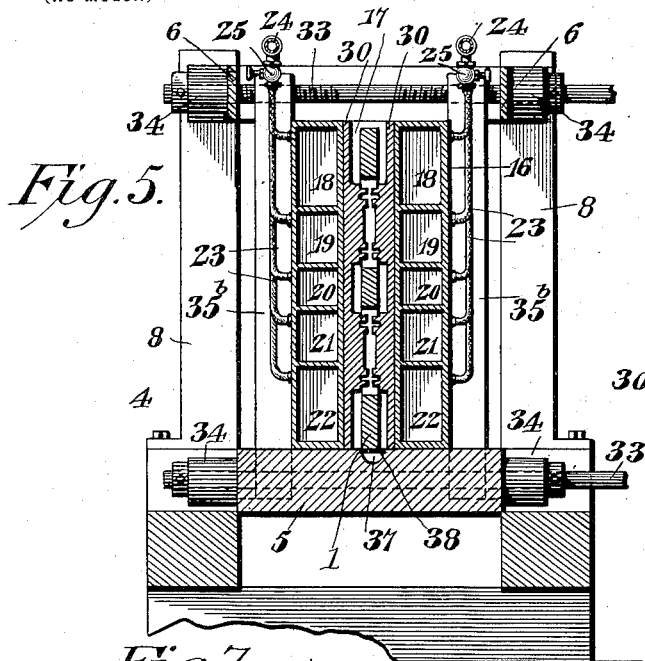

UNITED STATES PATENT OFFICE.

JAMES MARSHALL LEAVER, OF BAY MILLS, MICHIGAN, ASSIGNOR TO LEWIS A. HALL AND ROBERT H. MUNSON, OF SAME PLACE.

APPARATUS FOR MANUFACTURING ARTICLES FROM PULP MATERIALS.

SPECIFICATION forming part of Letters Patent No. 656,742, dated August 28, 1900.

Application filed November 8, 1899. Serial No. 736,277. (No model.)

*To all whom it may concern:*

Be it known that I, JAMES MARSHALL LEAVER, a citizen of the United States, residing at Bay Mills, in the county of Chippewa and State of Michigan, have invented a new and useful Apparatus for Manufacturing Articles from Pulp Materials, of which the following is a specification.

This invention relates to the manufacture of articles from pulp materials, and has special reference to an apparatus designed for the manufacture of doors, shutters, sash, blinds, window-frames, door-frames, furniture, interior finish for houses, and other products or articles of a like nature.

To this end the invention primarily contemplates a novel construction of apparatus having means for manufacturing in a cheap and practical manner articles which are ordinarily constructed entirely of wood or of pulp, and has specially in view the production of substantially-solid articles or products from pulp materials which have heretofore been of a laminated formation.

With these and other objects in view the invention consists in the novel construction, combination, and arrangement of parts hereinafter more fully described, illustrated, and claimed.

The essential features of the apparatus or machine are necessarily susceptible to modification without departing from the spirit or scope thereof; but the preferred embodiment of the improvements forming the subject-matter of the present application is shown in the accompanying drawings, in which—

Figure 1 is a plan view of an apparatus embodying the improvements contemplated by the present invention. Fig. 2 is an end view thereof. Fig. 3 is a longitudinal sectional view on the line 3 3 of Fig. 1, showing the core of the article centered in the working space between the platens without the pulp materials being applied thereto. Fig. 4 is a similar sectional view on the line 4 4 of Fig. 1, showing the arrangement of the piping for each of the movable platens. Fig. 5 is a cross-sectional view on the line 5 5 of Fig. 3. Fig. 6 is an enlarged detail plan view of one end portion of the mold, showing the end door swung open. Fig. 7 is a plan view, partly in section, of a pulp door illustrative of one form of article that can be manufactured by the apparatus. Fig. 8 is a plan view of the form of core which is usually employed in constructing a door from pulp materials such as shown in Fig. 7. Fig. 9 is a cross-sectional view on the line 9 9 of Fig. 7.

Like numerals of reference designate corresponding parts in the several figures of the drawings.

In manufacturing articles from pulp materials by the apparatus claimed herein there is used in every instance a core of some description, which may be of any suitable material, but preferably of wood, on account of the strong adhesive contact that may be secured between the same and the pulp material. Inasmuch as the articles made by the apparatus have a suitable core to form a base or binder for the pulp material, the operation of the apparatus will be fully understood by describing the same for illustrative purposes in connection with the formation of a door from pulp materials, and in the construction of an article of this character the core 1 is of the same general configuration as the door, being of a rectangular form, as shown in Fig. 8 of the drawings. The said rectangular core 1, though it may be of metal or other suitable material, is preferably constructed of wood, for the reasons explained, and is made in the form of a skeleton framework. Although in some forms of articles made from pulp materials and manufactured by the machine the core may be solid or hollow or even imperforate, still in the construction of a door or analogous article with a panel or panels it is necessary to provide the skeleton core 1 with panel-openings 2, which conform in size, shape, and disposition to the panel or panels of the completed article, and as these panel-openings entirely pierce the core the same are completely filled by the pulp materials 3, which are molded and pressed upon the core in a manner to be presently explained. By referring particularly to Fig. 9 of the drawings it will be observed that the pulp material forming the part numbered 3 of the door or like structure by being pressed upon the core from both sides thereof not only covers the side faces of the core, but the panel portions of the pulp material completely fill the panel opening or openings of the core and produce a solid homogeneous mass of material in said opening or openings, thus producing a practically-solid structure having exceptional strength and durability.

Having explained the general nature of the pulp articles that can be manufactured through the medium of the apparatus, a description of the latter will now be given.

The said apparatus includes a mold-box 4, which is preferably of a shape conforming to the outlines of the article to be manufactured therein; but ordinarily the said mold-box is of a rectangular shape, and essentially consists of a bottom or base 5 and the side and end walls 6 and 7, respectively, arising from the said bottom or base 5. The side and end walls 6 and 7 of the mold-box are rigidly joined together at their contiguous edges by the corner-posts 8, which are fastened to the side and end walls by bolts or other suitable fastenings to form therein, in connection with the bottom or base 5, a substantially-tight box structure, which is designed to receive therein not only the pulp material and the core of the article, but also the instrumentalities which provide for molding, pressing, and baking the article, so that when the same is removed from the box it is in a practically-finished condition.

The mold-box 4, as already explained, may be of any suitable shape, though the same is preferably of a rectangular form and open at the top to permit of the escape of heat, vapor, and any waste product which may result from the baking of the pulp material within the top portion of the box; but in carrying out the invention the end walls 7 of the mold-box are preferably constructed with access-openings 9, which are adapted to be covered and uncovered by swinging end doors 10. Each end door 10 when swung into the opening with which it is associated entirely closes that end of the mold-box. To provide for the swinging support of the end doors, each of the same is provided near one edge and at the upper and lower corners thereof with pintle-studs 11, journaled in suitable bearings 12, formed in the upper and lower sills of the end walls, and at its free unpivoted edge each door is provided with a plurality of offstanding bifurcated lugs 13, adapted to be engaged and disengaged by the swing-bolts 14, fitted to and carried by a rock-shaft 15, journaled in suitable bearings at one edge of the access-opening 9. When one of the end doors 10 is closed, it is simply necessary to move the adjacent swing-bolts 14 into engagement with the lugs 13 thereof and to tighten said bolts to provide for securely fastening the door in its closed position. A loosening of the bolts and the swinging of the same away from the adjacent edge of the door will permit of the ready opening thereof to provide for either the insertion of the core of the article or the removal of the completed article. It will be observed by reason of this construction of the mold-box with swinging end doors fitted to the opposite end walls thereof simple and efficient means are provided whereby ready access may be had to the interior working space of the mold-box through the ends thereof, thus greatly facilitating the handling of the core and the removal of the completed article.

The open-top mold-box constructed as described is of a sufficient size to receive therein a pair of movable platens 16. These platens conform to the interior shape of the mold-box, the same extending the full length thereof from end to end and being of a width substantially equaling the depth of the box. The said platens are arranged in parallelism to form therebetween a working space 17, and each of the same is of a hollow formation, being provided therein with a plurality of separate and independent heating-chambers 18, 19, 20, 21, and 22, respectively, said heating-chambers being of variable sizes to practically carry out the progressive application of heat in the manner herein described. In the form of the apparatus shown in the drawings, particular reference being made to Fig. 4, the separate and independent heating-chambers extend longitudinally from end to end of the platen and are arranged closely together, though not in communication, to provide for the heating of the entire surface of the platen which comes in contact with the pulp material within the working space 17 of the mold-box. Each of the several heating-chambers of each platen 16 has a separate and independent flexible-pipe connection 23 with a common supply-pipe 24 for the heating agent, which may be steam, hot air, or hot water, as may be found the most suitable for the purpose, according to the nature and composition of the pulp material that may be used in the construction of the article, and each of the flexible-pipe connections, which may be properly termed "distributing-pipes," for the heating agent is fitted with a controlling-valve 25, which provides means whereby each heating-chamber of the platen may have the heating agent supplied thereto or cut off therefrom independently of the remaining chambers. In addition to the individual supply-pipe connections for the several heating-chambers of each platen such chambers have also connected therewith, preferably at the ends thereof, separate and independent flexible drain-pipe connections 26, leading to the main drain-pipes 27, arranged exterior to the mold-box and providing, in connection with the flexible pipes 26, means for draining off from the chambers of the platens such condensed products or waste material as may result from the heating step.

The movable platens 16 in addition to the heating-chambers thereof are each preferably provided at their ends contiguous to the end walls of the mold-box with packing-strips 28, loosely fitted to the platens in any suitable manner and yieldingly projected beyond the ends thereof by springs 29 or equivalent devices, which provide means for holding the packing-strips yieldingly in contact with the end walls or doors of the mold-box to provide for closing the interstices at this point to prevent leakage of the pulp material, while at the same time allowing for the contraction and expansion of the platens without interfering with their proper movement toward and away from each other in the operation of the apparatus. The said platens, which are designed to move toward and away from each other, have fitted upon their opposing faces suitable dies 30. These dies may be held to the platen by holding-clips or any suitable means which permit of their ready attachment and removal, and the same are of any desired configuration or design which is to be impressed upon the pulp material. In the construction of doors or analogous structures with a panel or panels the projecting portions of the dies are designed to work into the panel opening or openings of the core and not only press the pulp material through said opening or openings in a solid homogeneous mass, but at the same time impressing upon the pulp material the design or ornamental beading with which such articles are usually provided.

The core 1 of the article, which is inserted into the working space 17 between the two platens through the access-opening at either end of the mold-box, is designed to be sustained in an upright position between and parallel with the platens, preferably by means of the centering-screws 31, mounted in the end doors 10 of the mold-box, and preferably provided with inner pointed ends 32, adapted to engage with the ends of the core, and thereby hold it in proper position to permit the pulp material to be pressed and molded into shape thereon.

In the operation of the apparatus it will be necessary to provide for the movement of the platens toward and away from each other, and to secure this movement in a positive manner there are employed pairs of operating-screws 33, arranged respectively above and below the platens at the top and bottom of the mold-box, as plainly shown in Figs. 4 and 5 of the drawings. The pairs of operating-screws 33 are swiveled or journaled at opposite sides of the mold-box in suitable bearings 34 and are also provided with separate right and left threaded portions 35, which work in the threaded openings $35^a$, formed in the extremities of the upright carrier-bars $35^b$, to which the platens are suitably fastened, so as to be carried thereby. The operating-screws 33 are extended beyond one side of the mold-box and are designed to be associated with gearing or any other suitable operating means to provide for turning the same either backward or forward, according to the desired movement to be imparted to the movable platens, and at this point it will be observed that by reason of attaching the platens to the carrier-bars $35^b$, which project above and below the same, there is no interference whatever with the action of the platens upon the material, and the necessity of piercing the platens with threaded openings for the reception of the screws is obviated. When the screws 33 are turned in one direction, the movable platens 16 will be caused to approach each other, while the turning of the screws in the opposite direction will cause the platens of each pair to recede from each other and away from the article formed therebetween, and it may be observed at this point that the platens may be caused to move at any rate of speed that may be desired, and the operation may be stopped during any step of the process and again resumed, as experience and the nature of the material may require. It will further be observed that in the preferable construction of the apparatus the inner faces of the end doors and the bottom of the mold-box are planed perfectly true to prevent leakage, the packing-strips 28, already referred to, assisting in securing this desirable result.

In constructing the apparatus it is also desirable to provide means for allowing the heat, vapor, and waste material to escape from the edges of the article during the baking thereof. To make provision for this, the bottom or base 5 of the mold-box is provided in the upper side thereof with a longitudinal waste channel or gutter 37, extending from end to end of the bottom and declining toward both ends thereof, so that any waste product or material entering the same may be readily discharged at the ends of the mold-box. The said longitudinal channel or gutter 37 is arranged in such a position as to be disposed at the bottom of the working space 17, and at its upper open side the said channel or gutter 37 is preferably covered by a perforate cover-plate 38, formed of perforated metal, wire-gauze, or equivalent material. In addition to providing the bottom 5 of the mold-box with the waste channel or gutter 37 the end doors or walls thereof are also provided in their inner faces with longitudinally-disposed channels or gutters 39, which are covered by perforate cover-plates 40, similar to the perforate cover-plate 38, and which when the doors are closed communicate with the bottom waste channel or gutter 37, and thereby provide for the complete removal of such waste products or materials as may escape from the edges of the article during the baking process.

After having prepared the pulp material the core, which is inserted through one of the end access-openings and supported in place by the centering-screws 31, is completely enveloped with the pulp material, so that the same will fill any interstices or openings with which it may be provided. With the core in position and enveloped by the pulp material heat may be applied to all of the heating-chambers of the platen at one time or to such chambers as may be considered desirable; but a preferable way of carrying out the process is to first admit the heating agent to such heating-chambers of each platen, through the distributing-pipe connections as are in closest proximity to the densest portions of the pulp material. This will result in warming up the thickest portions of the pulp materials first, causing the vapor and waste products to work out of the same toward the edges. By then applying the heating agent to the adjoining chambers the vapor and waste products will be still more worked out toward the edges of the doors, so that when the heating agent is finally admitted to the uppermost and lowermost heating-chambers of the platens the baking of the pulp article will be thoroughly accomplished. By reason of this operation uneven baking of the material may be obviated and a practically-uniform result obtained, which is very desirable in the construction of such articles as doors and the like. While heat is applied to the platen through the medium of the heating-chambers and pipe connections described, the adhesive compound added to the pulp material is caused to fuse and harden and the vapor passes out through the open top of the box, while vapor accompanied by other waste products is also permitted to readily escape into the waste-channels 37 and 39. During the baking of the pulp material motion is imparted to the movable platens, which are caused to approach each other gradually until the vapor and waste products have been thoroughly eliminated and the resultant mass is completely baked, and consists of the interior core 1 and the homogeneous body 3, entirely surrounding the same and completely filling any interstices or openings thereof. At the time the platen presses the pulp material upon its core the die-faces or dies 30 thereof will impress upon the surfaces of the pulp material any desired design or ornamentation. When the article has thus been completed, the movable platens are caused to recede from the same, so that the article can be readily removed through either end door.

In connection with the construction described it will be observed that the provision of the waste-channels greatly shortens the operation of drying.

While a single form of the apparatus has been described, it will be understood that the same may be used in series by having a number of platens arranged in succession with the operating-screws common to all of the same; but as this is a mere duplication of the apparatus described illustration thereof has been deemed unnecessary.

From the foregoing it is thought that the construction, operation, and many advantages of the herein-described apparatus will be readily understood by those skilled in the art without further description, and it will be understood that various changes in the form, proportion, and minor details of construction may be resorted to without departing from the principle or sacrificing any of the advantages of the invention.

The process carried out in operating the herein-described apparatus forms no part of the present application, but constitutes the subject-matter of my contemporaneously-pending application, Serial No. 736,278.

Having thus described the invention, what is claimed as new, and desired to be secured by Letters Patent, is—

1. In an apparatus for manufacturing articles from pulp materials, a mold-box, a pair of upright movable platens arranged in spaced parallel planes, and working within the box over and upon the floor thereof, said platens carrying dies upon their opposing faces, supporting means, carried by the mold-box, for holding the interior core of the article between the platens for receiving its envelop of pulp material, and means for simultaneously moving both platens in opposite directions.

2. In an apparatus for manufacturing articles from pulp materials, a mold-box having a flat floor, a pair of upright movable platens arranged in parallel planes and working within the mold-box, upon the flat floor thereof, said platens carrying dies upon their opposing faces, means for applying heat to the platens, and supporting means, carried by the mold-box, for holding the interior core of the article in position for receiving its envelop of pulp material, substantially as set forth.

3. In an apparatus for manufacturing articles from pulp materials, an open-top mold-box having a flat floor, a pair of upright movable platens arranged in parallel planes with their lower edges working upon and over the flat floor of the box, said platens having interior heating-chambers, and dies upon their opposing faces, supporting means, carried by the mold-box, for holding the interior core of the article in position, for receiving its envelop of pulp material, and means for simultaneously moving the platens in opposite directions, substantially as set forth.

4. In an apparatus for manufacturing articles from pulp materials, a mold-box having a flat floor, a pair of upright movable platens arranged in spaced parallel relation within the box and working upon and over the flat floor thereof, said platens carrying upon their opposing faces dies, core-centering screws mounted within the end walls of the box and projecting into the space between the platens to temporarily support the core of the article in position for receiving its envelop of pulp material, and means for simultaneously moving both platens in opposite directions, substantially as set forth.

5. In an apparatus for manufacturing articles from pulp materials, a mold-box provided in the floor thereof with a longitudinal waste-channel, and in its opposite end walls with vertically-disposed waste-channels in communication with the channel in the floor of the box, and movable platens arranged to work within the box respectively at opposite sides of the vertical plane of the communicating waste-channels.

6. In an apparatus for manufacturing articles from pulp materials, a mold-box, having end doors and also provided with screened waste-channels in its floor and also in the inner faces of said doors, said waste-channels being in communication with each other, and movable platens arranged to work within the box respectively at opposite sides of the vertical plane of the communicating waste-channels, substantially as set forth.

7. In an apparatus for manufacturing articles from pulp materials, a mold-box provided in the floor thereof with a screened waste-channel declining toward both ends of the box and open throughout its length, said mold-box being further provided in the end walls thereof with vertically-disposed screened waste-channels, in communication with the open waste-channel in the floor of the box, and a pair of platens working within the box respectively at opposite sides of the vertical plane of the communicating waste-channels, said platens being provided at their ends with yielding packing slidably contacting with said end walls, substantially as set forth.

8. In an apparatus for manufacturing articles from pulp materials, a mold-box having door-inclosed openings at its ends, a pair of platens arranged within the box and carrying dies upon their opposing faces, and means for moving said platens toward and away from each other, substantially as specified.

9. In an apparatus for manufacturing articles from pulp materials, a mold-box having end doors, fasteners for said doors, a pair of platens arranged within the box and carrying dies upon their opposing faces, and means for moving said platens toward and away from each other, substantially as specified.

10. In an apparatus for manufacturing articles from pulp materials, a mold-box having end access-openings, swinging doors arranged to cover and uncover said openings, rock-shafts fitted to the ends of the box and carrying a plurality of swing-bolts engaging with the doors, a pair of platens arranged within the box and carrying dies, and means for moving the platens toward and away from each other, substantially as specified.

11. In an apparatus for manufacturing articles from pulp materials, a mold-box, a pair of platens arranged within the box, and carrying dies, carrier-bars attached to the platens, and provided in their ends with threaded openings, and suitably-operated screws mounted within the mold-box and having right and left threaded portions engaging with said threaded openings of the carrier-bars, substantially as specified.

In testimony that I claim the foregoing as my own I have hereto affixed my signature in the presence of two witnesses.

JAMES MARSHALL LEAVER.

Witnesses:
WM. M. DRAKE,
WM. H. FULLER.